J. E. Crowell,
Wood Planing Machine.
Nº 11,634.          Patented Aug. 29, 1854.
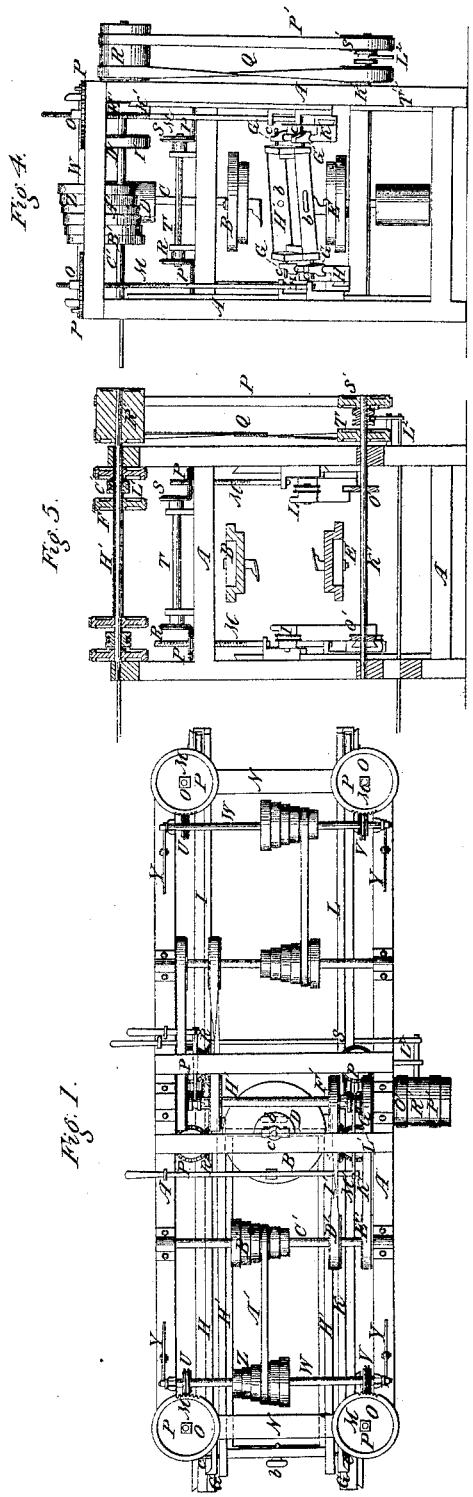
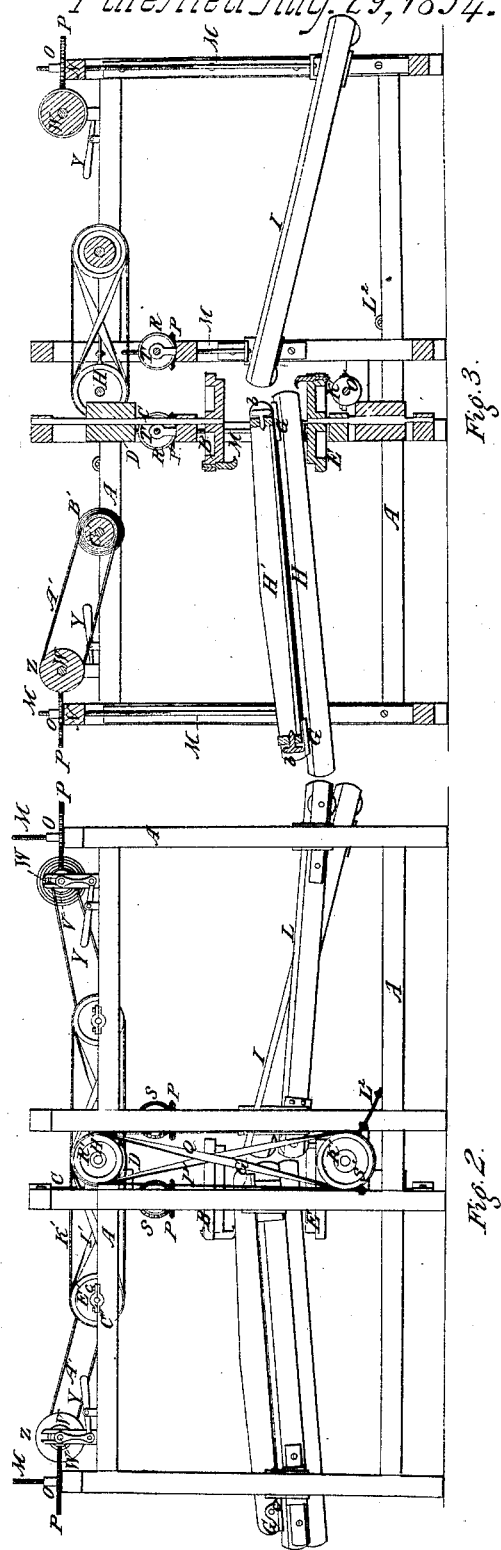

UNITED STATES PATENT OFFICE.

JAMES E. CROWELL, OF SALEM, MASSACHUSETTS, ASSIGNOR TO J. E. CROWELL, E. SMITH, AND CHAS. T. STICKNEY.

MACHINE FOR DRESSING SHIP-TIMBER.

Specification of Letters Patent No. 11,634, dated August 29, 1854.

*To all whom it may concern:*

Be it known that I, JAMES E. CROWELL, of Salem, in the county of Essex and State of Massachusetts, have invented new and useful Improvement in Machinery for Dressing or Reducing Ship-Timber or Much of Such as may be of a Winding or Irregular Shape; and I do hereby declare that the same is fully described and represented in the following specification and the accompanying drawings, letters, figures, and references thereof, Of the said drawings, Figure 1, represents a top view of my said machine for dressing ship timber. Fig. 2, is a side elevation of it. Fig. 3, is a vertical central and longitudinal section of it. Fig. 4, is an end view of it. Fig. 5, is a vertical and transverse section of it taken through its cutting wheels.

In the said drawings A denotes the framework for supporting the operative parts of the machine it being constructed in any suitable manner and of any proper material for such purpose.

The said machine consists as follows: 1st, it has a large wheel, B, arranged horizontally and having one or more gouge or adze cutters placed on the underside. Said cutter wheel has its axle or shaft, C, arranged vertically and provided with a driving pulley, D, around which pulley a belt may be made to run so as to put the cutter wheel in revolution. There may also be another cutter wheel, E, arranged under the former as seen in the drawings. Under the upper cutter wheel and between it and the under one is an open carriage, H', which should have suitable appliances or centering and confining screws *b, b,* for the purpose of securing within the carriage the piece of timber to be dressed. This carriage or platform has two round studs or projections, *c, c,* extending from each of its two sides and near the ends thereof as seen in the drawings. These several studs are respectively supported by and turn in four saddles or bearing slides, G, G, G, G, that respectively rest and slide on four rails H, I, K, L. Two of these rails, viz, those marked, H, L, are arranged on one side of the carriage and in the same vertical plane, and one in advance of the other. The other two rails are similarly arranged on the opposite sides of the carriage. Each of said rails, has at or near each end of it, and applied to it and the frame of the machine a suitable contrivance or device for either elevating or depressing the said end or adjusting it to any desirable height in a vertical direction in order that the two inner ends of two of the side rails H, K, or I, L, may be adjusted with respect to one another, as may be the two outer ends of the other two rails, or in other words, so as to give to the carriage during its longitudinal movements such a transverse movement or movements as may be necessary to enable the cutter wheel to properly dress the winding or irregular surface of the piece of timber borne by the carriage. To this end, each end of each bearing rail is upheld by a screw rod M, which is suitably jointed or connected to it, so that while the screw rod is elevated or depressed in a vertical direction, it will raise or lower that end of the screw rail with which it may be connected. Each screw rod works upward, through one of the cross timbers N, N, of the framework and has a female screw nut, O, screwed upon it, such screw nut carrying a cog wheel, P. The said cog wheels, that are applied to the four outer screws are represented in the drawings as spur gears, while those of the inner screws are exhibited as beveled gears, the whole being arranged as seen in the drawings.

The beveled gears of the screws of each two rails H, K, or I, L, are connected together by two beveled gears R, S, fixed upon a shaft, T, the same being so as to enable them to be simultaneously put in rotation when said shaft is rotated. The spur gears of each set of the two outer screws work respectively into endless screws U, V, fixed upon a horizontal shaft, W, there being two of said shafts, W, arranged as seen in the drawings and one being applied so as to operate each set of gears. Each of these shafts is supported in such bearings as will admit of each of its ends being elevated high enough to throw the endless worm, or screw adjacent to such end out of action with the spur gear of said worm; the same being to enable one only of the two rails directly under said shaft to be elevated or depressed at any time while the other is stationary. This movement of the said shaft may be effected by a lever, Y, so applied to it as seen in the drawings, there being such a lever applied to each end of the shaft.

One of the shafts, W, is a set of cone pulleys, Z, which is connected by an endless band, A', with another set of cone pulleys, B', fixed upon a horizontal shaft, C', arranged as seen in the drawings. The shaft, C', carries two pulleys D', E', which are made to operate in connection with two clutch pulleys F', G', fixed upon a driving shaft, H'. Two endless belts, I', K', travel around the two clutch pulleys F', G', and the two pulleys D', E', as seen in the drawings, one of these belts being a cross belt. A clutch, L', worked by a lever, M', is applied to the driving shaft and so as to enable a person to clutch either of the clutch pulleys to the shaft at pleasure.

The object of the mechanism just described and connecting the driving shaft with the spur gears of either of the two outer screws, is to enable such spur gears to be rotated either in one direction or the other as occasion may require. In the drawings I have exhibited just such another mechanism as applied to the driving shaft and the spur gears of the two other screws.

The timber carriage may be drawn or moved longitudinally on its ways by means of ropes attached to it and made to work around pulleys, O', O', fixed on a shaft K', as seen in the drawings. This shaft receives motion in either one direction or the other, as the case may require, by means of endless bands, P', Q', made to work around a spring drum, R', (fixed on the driving shaft) and two clutch pulleys S', T', arranged and made to run loosely upon the shaft, K', such pulleys being clutched to the shaft as occasion may require by the action of the movable clutch, $L^2$.

Now as a principal feature of my machine in which I claim there is any particular novelty is—

The mode of supporting and guiding the movable carriage which carries the timber that is to be dressed, such consisting in employing four movable rails H, I, K, L, arranged and applied together and made adjustable so as to make the carriage during its longitudinal movements not only have a transverse dipping movement but also a longitudinal dipping movement, or such movements as will enable it to present to the cutter wheels in a proper manner, the waved surface to be dressed.

I am aware that in machines for turning irregular forms a pattern rail may have been used or that a carriage may have been supported so as to have vertical movements on stationary guide or pattern rails, but that straight rails arranged and made adjustable with respect to one another and applied to a carriage so as to regulate its movements as described have been used is not known to me, I therefore claim this improvement as my invention in the machine hereinbefore set forth for reducing or molding timber.

In testimony whereof, I have hereunto set my signature this twentieth day of March A. D. 1854.

JAMES E. CROWELL.

Witnesses:
R. H. Eddy,
Edwd. Smith.